(12) United States Patent
Neumaier et al.

(10) Patent No.: US 10,989,592 B2
(45) Date of Patent: Apr. 27, 2021

(54) HANDHELD SCANNER FOR IMPROVED STAIN DETECTION, SYSTEM COMPRISING SUCH A HANDHELD SCANNER, AND METHOD FOR OPERATION THEREOF

(71) Applicant: BSH HAUSGERAETE GMBH, Munich (DE)

(72) Inventors: Philipp Neumaier, Berlin (DE); Ramona Pourziaei, Berlin (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/757,491

(22) PCT Filed: Oct. 22, 2018

(86) PCT No.: PCT/EP2018/078841
§ 371 (c)(1),
(2) Date: Apr. 20, 2020

(87) PCT Pub. No.: WO2019/091765
PCT Pub. Date: May 16, 2019

(65) Prior Publication Data
US 2020/0249085 A1  Aug. 6, 2020

(30) Foreign Application Priority Data
Nov. 8, 2017 (DE) .......................... 10 2017 219 806

(51) Int. Cl.
*G01J 3/02* (2006.01)
*D06F 33/30* (2020.01)
(Continued)

(52) U.S. Cl.
CPC ............ *G01J 3/0272* (2013.01); *D06F 33/30* (2020.02); *G01J 3/0264* (2013.01); *G01J 3/42* (2013.01);
(Continued)

(58) Field of Classification Search
CPC .. D06F 2202/10; D06F 2210/00; D06F 33/00; D06F 33/30; D06F 34/18;
(Continued)

(56) References Cited

U.S. PATENT DOCUMENTS 6,629,439 B2   10/2003   Woebkemeier
6,784,997 B2   8/2004   Lorenz et al.
(Continued)

FOREIGN PATENT DOCUMENTS

DE   19809015 A1   9/1999
DE   19855503 A1   6/2000
(Continued)

*Primary Examiner* — Deoram Persaud
(74) *Attorney, Agent, or Firm* — Laurence A. Greenberg; Werner H. Stemer; Ralph E. Locher (57) ABSTRACT

A handheld scanner contains an IR spectrometer with a radiation source and a radiation detector, a control unit, an interface for wireless data communication, and a RGB sensor. The handheld scanner is configured to detect soiling on a laundry item. Additionally, the handheld scanner can be integrated into a system, and used in a method for operating the system.

16 Claims, 2 Drawing Sheets

(51) Int. Cl.
  *G01J 3/42* (2006.01)
  *G01J 3/50* (2006.01)
  *G01N 21/359* (2014.01)
  *G01N 21/94* (2006.01)

(52) U.S. Cl.
  CPC .............. *G01J 3/50* (2013.01); *G01N 21/359* (2013.01); *G01N 21/94* (2013.01); *G01N 2021/945* (2013.01)

(58) Field of Classification Search
  CPC ........ D06F 35/00; D06F 39/00; G01J 3/0272; G01J 3/0264; G01J 3/42; G01J 3/50; G01J 5/20; G01N 21/359; G01N 2021/945; G01N 21/94
  See application file for complete search history.

(56) References Cited

U.S. PATENT DOCUMENTS

| | | | |
|---|---|---|---|
| 9,528,877 | B2 | 12/2016 | Garbos et al. |
| 10,612,175 | B2* | 4/2020 | Hombroek .............. D06F 34/18 |
| 2003/0019253 | A1* | 1/2003 | Lorenz ................... D06F 58/30 68/13 R |
| 2008/0260242 | A1* | 10/2008 | MacKinnon ......... G06K 9/2027 382/162 |
| 2010/0205825 | A1* | 8/2010 | Ashrafzadeh ........... D06F 58/36 34/486 |
| 2016/0224860 | A1* | 8/2016 | Koven ................. G06K 9/4652 |
| 2018/0238796 | A1* | 8/2018 | Cooke ................ G01N 21/3563 |
| 2019/0264372 | A1* | 8/2019 | Kessler ................. G01J 3/0291 |
| 2019/0302091 | A1* | 10/2019 | Kessler ..................... G06T 7/60 |
| 2020/0116627 | A1* | 4/2020 | Kessler .................... G01J 3/501 |
| 2020/0134806 | A1* | 4/2020 | Kessler .................... G06K 9/00 |
| 2020/0372626 | A1* | 11/2020 | Dal Mutto .............. G06T 17/00 |

FOREIGN PATENT DOCUMENTS

| | | |
|---|---|---|
| DE | 102011076991 A1 | 12/2012 |
| DE | 102013104976 A1 | 12/2014 |
| DE | 102013210996 A1 | 12/2014 |
| DE | 102015100395 A1 | 8/2015 |
| DE | 102014102531 A1 | 9/2015 |
| DE | 102014112375 A1 | 3/2016 |
| DE | 102015201948 A1 | 8/2016 |
| EP | 1113553 A1 | 7/2001 |
| EP | 1242665 B1 | 3/2004 |
| WO | 0032865 A1 | 6/2000 |
| WO | 0146509 A1 | 6/2001 |
| WO | 2004053220 A1 | 6/2004 |
| WO | 2015055239 A1 | 4/2015 |

* cited by examiner

HANDHELD SCANNER FOR IMPROVED STAIN DETECTION, SYSTEM COMPRISING SUCH A HANDHELD SCANNER, AND METHOD FOR OPERATION THEREOF

BACKGROUND OF THE INVENTION

Field of the Invention

The invention relates to a handheld scanner for improved stain detection, comprising an IR spectrometer, having a radiation source and a radiation detector, a control unit and an interface for wireless data communication. The invention further relates to a system comprising a handheld scanner and a method for operating such a system.

Laundry items may be mechanically stressed to a greater or lesser extent according to the composition of the material thereof, and should be heated up only to a specific temperature. This has to be taken into account in washing programs and in drying programs. There are also restrictions since many laundry items should not be treated with specific chemical agents. It is also known that laundry items should be treated differently according to the degree or type of soiling thereof. Generally laundry items should be treated as gently as possible but the soiling thereof should be removed as completely as possible. The energy consumption which is required for the laundry treatment and which should be as low as possible is also significant. Finally, the time period, which for treating the laundry should be as short as possible, is important.

Thus, for example according to their design, the known laundry treatment appliances contain a plurality of washing programs and further laundry treatment programs, for example drying programs, from which a user of the laundry treatment appliance may select the program which in their own judgement is most suitable for the laundry to be treated and the soiling to be removed from the laundry. To this end, however, the user requires as much information as possible and in addition to this knowledge also a great deal of experience in order to be able to make a decision about the type of material in the laundry items to be treated and the type of soiling of the laundry items. This is particularly difficult when the laundry item no longer has a label. Frequently, therefore, it is not possible to detect the type of material of the laundry item and to determine the permitted treatment method. An effective removal of the soiling is at least impeded thereby.

It is, therefore, desirable to improve the treatment of laundry items in the household by, on the one hand, minimizing as far as possible the negative effects of the treatment on the laundry items and on the time period and energy consumption of the treatment program carried out and, on the other hand, by the soiling being efficiently removed.

Household appliances and methods for improving the laundry treatment are already known, as are household appliances comprising stain detection.

The publication DE 10 2011 076 991 A1 discloses a household appliance having fluid-guiding regions, in particular a washing machine or washer dryer, having at least one radiation source, in particular at least one UVC radiation source, wherein the at least one radiation source is attached to a protected point inside the household appliance and the radiation emitted by the radiation source is substantially deflected by a mirrored and/or reflective arrangement in the target region, in particular the target region comprising fluid, such as washing solution, and in particular in combination with the treatment material to be treated, such as laundry. It is also disclosed that UV radiation with a greater wavelength, such as UVA radiation, may be used for improved stain detection on items of clothing.

The publication WO 2001/046509 A1 discloses an appliance for treating textiles, comprising an apparatus for detecting properties of a textile, wherein the apparatus comprises at least one transmitting element and at least one receiving element for transmitting and/or receiving electromagnetic radiation, and an evaluation circuit connected to the receiving element, and wherein the radiation transmitted by the transmitting element and reflected and/or transmitted by the textile may be received by the receiving element and evaluated in the evaluation circuit.

The publication DE 10 2015 100 395 A1 discloses a spectrometer, in particular for installation in a sensor module, comprising a radiation source and the following components defining a beam path and/or arranged along the beam path: a sample chamber for a fluid to be examined, a first lens, a diffraction element, a second lens and a detector. Between the sample chamber and the diffraction element a restriction aperture is provided for restricting the effective diameter of the light beam incident on the diffraction element.

The publication EP 1242665 B1 discloses an appliance for treating textiles, comprising an evaluation circuit for detecting the type of textile and/or the humidity of a laundry item. The appliance uses transmitting and receiving elements for transmitting and/or receiving electromagnetic radiation and an evaluation circuit connected to the receiving element. A method for detecting properties of a textile item, for example in a washing machine or a laundry dryer, is also disclosed.

The publication DE 10 2013 104 976 A1 discloses a system comprising a household appliance, a mobile communication apparatus and at least one RFID transponder which is spatially assigned to the household appliance. An identifier of an RFID transponder located in a detection region of the communication apparatus may be read by means of the communication apparatus and an action programmed in a memory of the communication apparatus is able to be recalled by means of a respectively read identifier.

For improving the design of laundry treatment programs it is also known to analyze laundry items already before said laundry items are placed in a laundry treatment appliance. Thus the publication DE 10 2013 210 996 A1 discloses an analysis device for analyzing laundry items outside a laundry treatment appliance, at least having at least one camera and an evaluation apparatus for determining at least one laundry care-relevant property of at least one laundry item on the basis of at least one image recorded by means of the camera thereof. In one embodiment, the at least one laundry care-relevant property of the laundry item is able to be selected from a set of properties at least comprising a maximum treatment temperature, a suitability for machine drying, a degree of drying, a suitability for chemical cleaning, a color, a structure, a type of textile, a degree of soiling and a type of laundry item. Moreover, on the basis of at least one detected laundry care-relevant property of one or more laundry items, this analysis device is preferably designed to display a proposal for at least one laundry treatment program and/or for at least one laundry care product. In this case, the analysis device may be designed to permit a selection, on the part of the user, of the at least one laundry treatment program and to transmit the result of the selection to the laundry treatment appliance.

The publication DE 10 2015 201 948 A1 discloses a household appliance for treating objects, having a control apparatus and an operating device, comprising a data processing unit, a data storage unit in which a program library comprising treatment programs for the objects is stored, a data communication unit and an operating means, wherein the data communication unit provides a data connection between the operating means, the data processing unit, the data storage unit and the control apparatus of the household appliance, wherein the operating device is designed to permit a user to input data for a plurality of objects to be treated, an assignment routine which is able to compare the program library with the data input and to determine at least one optimized treatment option $B_{opt}$ for the simultaneous treatment of a plurality of objects to be treated being stored in the data processing unit, and the operating means permits the user to adopt an optimized treatment option or to alter said treatment option within predetermined limits, whereupon the optionally altered optimized treatment option $B_{opt}$ is transmitted to the control apparatus of the household appliance for carrying out the treatment program.

The publication DE 10 2014 112 375 A1 discloses a device for activating a household appliance, wherein the device comprises the following features: an interface for reading image information from a sensor matrix of a display unit of the household appliance, wherein the sensor matrix comprises photo sensors which are a component of pixels of the display unit; and an evaluation apparatus for providing a control signal for activating the household appliance by using the image information.

The publication DE 10 2014 102 531 A1 discloses a method for operating a household appliance, wherein by means of a mobile telephone comprising a camera the image of coded information is recorded and the coded information or user data encompassed by the coded information is transmitted to the household appliance. The household appliance extracts from the coded information the user data encompassed thereby and transfers this or the directly recorded user data into an internal memory, wherein the household appliance interprets the user data as an automatic program and processes said user data as an automatic program.

The publication WO 2015/055239 A1 discloses a washing machine with speech recognition and response capabilities and a method for the operation thereof, wherein for each laundry item a user inputs information relating to the typology (bed linen, shirts, undergarments, etc.) and a description of its characteristic, in particular the type of material, the degree of soiling and the color and the intensity thereof. This data is stored and on the basis of this information a data management system determines the most suitable washing program from the possible washing programs.

The publication WO 00/32865 A1 (EP 1135553 A1) discloses a laundry treatment machine comprising an electronic control apparatus for automatically carrying out laundry treatment programs, wherein a decision making means is provided for mechanically identifying the type of laundry items and for mechanically making the decision relative to the laundry treatment program by which the detected laundry items may be treated, and information output means are provided, the laundry treatment program which is mechanically determined by the decision making means being able to be presented thereby to a person as a proposal, and input means are provided, said input means being able to be actuated by a person for confirming the mechanically determined laundry treatment program. For identifying the laundry items, said laundry items may be manually placed in succession in front of a measuring head or sensor of the decision making means, wherein the measuring head may be a handheld device and the decision making means preferably contains a spectrometer for identifying the type of laundry items.

SUMMARY OF THE INVENTION

In view of this background to the invention, it was the object of the present invention to provide a handheld scanner (hitherto also simply called "handheld device") and a system comprising such a handheld scanner, which permit an improved detection and removal of soiling from laundry items for the user, in particular also in a household appliance. Preferably, it should be possible for the user of a household appliance to clean laundry items in a gentler, more energy efficient manner and in an optimal time period without a user having a great deal of information about the type of soiling and/or laundry items. Preferably, it is intended that a user is proposed the most suitable treatment program of the laundry items regarding the type and quantity of fiber material, the fiber component and the color of the laundry items. Preferably, this is intended to be able to be carried out in a household appliance. Moreover, it might be desirable if wirelessly networked devices could be used so that networked devices may be used in a particularly efficient and convenient manner in a household. A method for operating the system is also intended to be provided.

The solution of this object is achieved according to this invention by a handheld scanner and a system comprising this handheld scanner, as well as a method which is suitable for operating the system, having the features of the corresponding independent claims. Preferred embodiments of the handheld scanner according to the invention and the system according to the invention as well as the method according to the invention are set forth in the respectively dependent claims. Preferred embodiments of the system according to the invention and the method according to the invention correspond to preferred embodiments of the handheld scanner according to the invention and vice versa, even when this is not explicitly stated herein.

Therefore, the subject of the invention is a handheld scanner comprising an IR spectrometer, preferably an NIR spectrometer, having a radiation source and a radiation detector, a control unit, an interface for wireless data communication and an RGB sensor, wherein the handheld scanner is designed to detect soiling on a laundry item.

In this case the expression "detect soiling on a laundry item" may be interpreted broadly. In particular, the case is also encompassed by the invention that the handheld scanner scans laundry items generally at a reference point and a stain point, and transmits measured IR spectra and/or RGB values for further evaluation to an external device, in particular an external server. The result of the evaluation is then generally transmitted back to the handheld scanner and displayed in a suitable manner to a user of the handheld scanner, generally with recommendations for the further procedure for removing soiling, i.e. stains.

According to the invention, the design of the handheld scanner is not limited. The handheld scanner may have any shape and any construction, wherein the components may be arranged in any manner. In any case, the handheld scanner may be used with one or with both hands by a user. In a preferred embodiment, the handheld scanner has an optical and/or acoustic display device for evaluated data from the IR spectrometer and/or RGB sensor.

The type of the at least one radiation detector according to the invention is not limited. Any radiation detector which permits the detection in the IR and, in particular, in the NIR range may be used. Generally, a structure of the at least one IR spectrometer in reflection is used.

An NIR spectrometer generally operates in a wavelength range of 800 to 2500 nm.

An RGB sensor is generally a signal-emitting optical device for the selective detection and evaluation of the visible spectral range, wherein generally broadband light sources (generally high-power white light LEDs) are used. An RGB sensor generally operates according to the triple range method in which a chromaticity is determined by using suitable color filters in three channels in broadband and separately for the colors red, green and blue.

Preferably the handheld scanner contains an input unit for inputs by a user. These inputs are, in particular, inputs of additional information relative to the soiling of laundry items and preferably also relative to the laundry items per se, for example the shape thereof or other design; whether for example the laundry items are short-sleeved or long-sleeved shirts, blouses, etc. The input of additional information may, in particular, be a selection from predetermined decision options. In this case, decision options may refer to proposed stain removal programs or other proposals for removing soiling on the laundry items. At this point is should be mentioned that the terms "soiling" and "stains" are used synonymously herein.

If in embodiments of the invention a determination of clothing types to be cleaned is also provided, a decision option may also refer, for example, to the selection from probable clothing type clusters (also denoted herein as cloth type clusters and/or auxiliary category clusters).

In embodiments of the invention, as a result of the inputs made by a user on the handheld scanner, which may then also be denoted as a whole as the "handheld device", a treatment program and/or stain removal program to be carried out by a laundry treatment appliance may be selected for processing. Thus, in principle, it is also possible to control a laundry treatment appliance by means of the handheld scanner. The mode of operation of the input unit according to the invention is not limited. Thus inputs may be executed by touch, speech or by the input of a text.

The operating unit and the optical and/or acoustic display device may also be present in the handheld scanner as a unit, for example in the form of a touchscreen.

In a quite particularly preferred embodiment of the handheld scanner, the control unit is designed for communication with an external server (also able to be denoted as the "cloud") via the interface for wireless data communication, in which communication the first and/or second data of the IR spectrometer and/or the RGB sensor, preferably the first and second data of the IR spectrometer and the RGB sensor relative to laundry items measured by the handheld scanner at a reference point and a stain point, is transmitted to the external server, this first and second data is evaluated in the external server regarding the type and/or quantity of soiling, and optionally the fiber material and the fiber component and/or the visual color, and these evaluations may then be transmitted as third data to the handheld scanner and/or a laundry treatment appliance.

In this case it is preferred if the third data is transmitted to the handheld scanner where it may be displayed on an optical and/or acoustic display device, preferably in the form of selection options, and a user may make additional inputs based on the third data relative to the soiling and preferably also relative to the measured laundry items. Generally, based on these inputs by the user, an even more suitable laundry treatment program and/or stain removal program may be proposed or selected, which permits an improved removal of soiling. In this case the laundry treatment program and/or stain removal program per se may be already stored in the control unit of the handheld scanner or the control unit of the household appliance. According to the invention, however, via further inputs on the handheld scanner it is also possible, for example, that a user modifies a program to be carried out in the laundry treatment appliance, for example a drum rotation speed, the duration and direction of rotation of the drum and a treatment temperature.

Finally, other proposals for removing soiling may also be made to a user of the handheld scanner, wherein the proposed measures do not necessarily have to be carried out in a laundry treatment appliance. Thus it may also be proposed to the user of a handheld scanner to soften the laundry items, wherein proposals may be made for the duration and temperature during softening, i.e. in particular said proposals may be displayed on the handheld scanner. Optionally, a washing video or images of treatment measures could also be displayed.

Finally, a recommendation for an anti-stain detergent could be displayed, optionally with information relative to procurement options and/or manufacturers and dosage recommendations. In this case, an attachment to further devices is also possible so that displays may also be implemented, for example, on a smartphone or tablet computer.

In embodiments of the invention, using the first and second data, advantageously fiber materials and fiber components are also determined in the external server, in addition to the soiling of the laundry items. These may be displayed to a user as part of the third data. Preferably in this embodiment, the fiber materials and fiber components determined in the external server are assigned textile item classifications as third data. These textile item classifications may be designed differently according to whether the type of textile is considered alone (for example synthetic polymers, so-called poly-clusters; silk, so called "silk clusters"; chemical cellulose, and the like, so-called "chem-cellulose+elastane clusters") or additionally the fiber components are also considered. Preferably, the fiber components are also considered. In this case it has proved advantageous to divide the fiber components into different range groups (for example 90-99% for a main component) and to weigh the various fiber components differently. As a result, therefore, for example so-called sensor signal codes (SSC) are obtained which then preferably form the basis of the output and display of the relevant third data.

A further subject of the invention is a system for treating laundry items comprising a handheld scanner, an external server and a laundry treatment appliance, wherein the handheld scanner has an IR spectrometer, preferably an NIR spectrometer having a radiation source and a radiation detector, a control unit, an interface for wireless data communication with the external server and an RGB sensor, and is designed to detect soiling on a laundry item.

Preferably, in this case the handheld scanner, the external server and laundry treatment appliance are designed for carrying out a method for operating the system, comprising the steps (a) first scanning of at least one laundry item with the handheld scanner at a reference point, and recording an IR spectrum and/or RGB sensor signals;

(b) transmitting the IR spectrum obtained in step (a) and/or the RGB sensor signals obtained in step (a) as first data to the external server;

(c) second scanning of the at least one laundry item of step (a) with the handheld scanner at a stain point of the at least one laundry item comprising soiling;

(d) transmitting the IR spectrum obtained in step (c) and/or RGB sensor signals obtained in step (c) as second data to the external server;
(e) evaluating the IR spectra and/or the RGB sensor signals regarding the type and/or quantity of soiling as third data; and
(f) transmitting the third data to the handheld scanner and/or the laundry treatment appliance.

"Stain point" has the same meaning herein as "stain point comprising soiling". Since a soiled laundry item may comprise a plurality of different stains, according to the invention it is provided that the step (c) may be carried out once or repeatedly, in order to take into account more stains if required. Preferably, the second data then encompasses the data for a plurality of stains.

Thus a further subject of the invention is a method for operating a system for treating laundry items, comprising a handheld scanner, an external server and a laundry treatment appliance, wherein the handheld scanner has an IR spectrometer, having a radiation source and a radiation detector, a control unit, an interface for wireless data communication with the external server and an RGB sensor, comprising the steps (a) first scanning of at least one laundry item with the handheld scanner at a reference point, and recording an IR spectrum and/or RGB sensor signals;
(b) transmitting the IR spectrum obtained in step (a) and/or RGB sensor signals obtained in step (a) as first data to the external server;
(c) second scanning of the at least one laundry item of step (a) with the handheld scanner at a stain point of the at least one laundry item having soiling;
(d) transmitting the IR spectrum obtained in step (c) and/or RGB sensor signals obtained in step (c) as second data to the external server;
(e) evaluating the IR spectra and/or the RGB sensor signals regarding the type and/or quantity of soiling as third data; and
(f) transmitting the third data to the handheld scanner and/or the laundry treatment appliance.

In the method according to the invention, therefore, at least two spectra are recorded, said two spectra then being generally sent to an external server, which has suitable software which may also be denoted as "(chemometric) cloud prediction model".

The reference point is generally an unsoiled point on the laundry item which is used as a reference. According to the invention, however, the reference point may also be located on a clean laundry item.

The stain point substantially comprises a mixture of a plurality of substances which form the soiling and are located on the fibers of the laundry item.

Moreover, in the method according to the invention as described above, by means of the RGB sensor color information is recorded and also sent to the cloud prediction model. This color information is generally three color values (in each case a red, green and blue value) of the clean part of a laundry item, in particular the reference point. Additionally, generally a so-called clear value which corresponds to the total reflected light is recorded by the RGB sensor. In this case, generally a referencing is subsequently made to the clear value.

Similarly, in each case generally three corresponding color values (in each case a red, green and blue value) are recorded from the stain(s) located on the laundry item. Additionally, generally a so-called clear value which corresponds to the total reflected light is recorded. In this case, a referencing is subsequently made to the clear value.

In a preferred embodiment of the method according to the invention, in any case in step (a) at the reference point and in step (c) at at least one stain point three color values, namely a red, a green and a blue value, and a clear value, which corresponds to the total light reflected, are recorded as RGB sensor signals.

In order to obtain using the measured RGB values information about the composition of the stain, the color differences are determined by the RGB color values, for example by being subtracted from one another and referenced relative to one another. For example, the following referencings V1 and V2 may be made, wherein RGBs are the RGB values of the stain point(s) (s=stain) and RGBc are the RGB values of the reference point (c=clean):

$$V1 = RGBs - RGBc \text{ or}$$

$$V2 = RGBs/RGBc$$

Preferably, in step (e) the RGB values measured at the stain point and at the reference point are subtracted from one another.

In a preferred embodiment of the method according to the invention, in a step (a-1), which is preferably undertaken before the step (a) at a reference point, when the radiation source of the IR spectrometer is switched off a dark spectrum D is recorded.

Generally, a user is requested via the operating unit, i.e. the user interface of the handheld scanner, initially to scan the clean point (reference point) and then the soiled point (stain point). According to the invention, preferably directly before the scan of the clean point which is carried out with the lighting source switched on, when the lighting source is switched off a dark spectrum is recorded automatically, said dark spectrum then also being generally sent to the external server. The dark spectrum may be regarded as the fourth data, which is preferably considered when evaluating the first and second data.

In order to obtain a reflection spectrum R of the stain per se, i.e. free from the influence of the material of the laundry item, the reflection spectrum I recorded at the stain point is compared with the reflection spectrum $I_c$ at the reference point, i.e. generally a clean point. The reflection spectrum of the stain per se which is obtained in this manner, for example, contains the qualitative and quantitative information relative to substances in stains which are analyzed on the external server, i.e. in the cloud, generally by applying chemometric algorithms, such as for example PLS-DA, SIMCA, PLS-regression or ensemble methods.

In a preferred embodiment of the method according to the invention, in order to obtain a reflection spectrum R of the stain, therefore, the reflection spectrum I recorded in step (c) at the stain point is compared with the reflection spectrum $I_c$ measured in step (a) at the reference point, wherein by considering a dark spectrum D the following formula is used for determining the reflection spectrum R:

$$R = (I - D)/(I_c - D)$$

In a preferred embodiment of the method according to the invention, in step (d) the second data is transmitted to the handheld scanner and displayed on an acoustic and/or optical display device of the handheld scanner. A user then makes an additional input relative to the measured soiled laundry items, optionally based on the third data. The display device is preferably designed as a touchscreen.

Moreover, in the method according to the invention it is preferred that the first and second data are assigned different types of soiling, by using the soiling established in the external server. Types of soiling, i.e. stains, generally contain hydrocarbons, fats, proteins, inorganic and organic acids and/or sugars, wherein the proportions of these chemical components generally differ.

In this case, individual types of soiling may be assigned to different stain classifications, in each case in a washing machine so-called anti-stain programs, generally as laundry treatment programs, being assigned thereto, in order to permit a removal of soiling from the laundry items which is as efficient as possible. These are: red wine, coffee, tea, cosmetics (for example lipstick), egg, chocolate, tomatoes, butter/oil, baby food, blood, stains on socks, sweat, soil/sand, strawberries and oranges.

These stain classifications are generally in each case assigned characteristic chemical substances. By an evaluation of the RGB sensor data and the IR spectra, these chemical substances may be determined so as to permit a more or less accurate assignment of the soiling on the laundry items to a stain classification, for example to one of the aforementioned classifications. The greater the number of chemical substances stored in the form of their IR spectra and RGB data, for example on the aforementioned external server, the more accurately the soiling may be determined. Preferably, the chemical substances contained in the stains are quantified regarding their chemical composition and, for example, transferred into a constituents histogram, generally an anti-stain program being assigned thereto.

An anti-stain program may preferably be initiated by the handheld scanner, which to this end for activation may preferably be integrated in a home network.

The anti-stain program generally has different program steps which differ in their type and time duration. According to the specific stain classification or preferably a constituents histogram which is as accurate as possible, then such program steps may be switched on or off and the chronological length thereof adapted. In this case, the input of mechanical energy, also denoted as mechanical input, in particular by selecting a drum rotation speed, a drum rotation pattern, in particular also a reversing etc. may be dynamically adjusted to the stain constituents histogram. Similarly, the temperature of a washing solution may be adjusted according to the stain classification and/or the constituents histogram.

When automatic dosage means for detergent are present, the type and quantity of the supplied detergent may be controlled accordingly.

In a preferred embodiment of the invention, the user of the handheld scanner has the possibility of making inputs on the handheld scanner relative to the soiling and/or the laundry items, in order to assist the evaluation of the spectra and RGB data and thus to contribute to an improved stain detection and thus stain removal.

Preferably for an improved removal of soiling on laundry items fiber materials and fiber components are assigned textile item classifications in the external server. In this case it is also advantageous if the fiber materials and fiber components established using the first and second data in the external server are assigned to clusters of fiber components and/or fiber quantities in the external server, and from the textile item classifications and the clusters of fiber components and/or fiber quantities so-called sensor signal codes are formed as further data in which the fiber materials and fiber components are contained as information. These may be displayed to a user as part of the third data.

According to the invention, it is also preferred that laundry treatment programs are assigned to the third data in the laundry treatment appliance according to the input of mechanical energy in laundry items. In this case, it is advantageous that in each case one or more laundry treatment programs are assigned to the types and quantities of soiling and preferably also the types of clothing and/or groups of types of clothing, optionally according to established visual colors, as third data.

If the user has made an additional input relative to the measured soiling and the laundry items per se, by having selected a type of stain and a type of clothing or group of types of clothing, for example, this selection may therefore be assigned a plurality of laundry treatment programs, for example washing or drying programs. Due to the established color or color category and a permitted input of mechanical energy for the selected laundry items, however, the number of possible treatment programs in the system which permit a removal of soiling may be significantly limited, so that an optimal treatment program is proposed to a user or even automatically carried out.

The laundry treatment appliance is generally a washing machine or a washer dryer.

The invention has numerous advantages. The invention permits information to be obtained about the soiling of laundry items and the removal thereof in a simple and rapid manner. In this case, a user of the handheld scanner may obtain proposals for suitable anti-stain programs in a household appliance or other stain removal methods. Moreover, the invention permits the possibility of an identification and communication between a user, the laundry treatment appliance and the laundry items to be cleaned, wherein the user is assisted in the decision-making relative to the laundry treatment and/or stain removal by the handheld scanner according to the invention and system. However, it is also possible in principle that a washing program with suitable stain removal is also started immediately, i.e. without a further decision by a user. Generally in this case different types and quantities of soiling and, in embodiments of the invention, different textile materials, clothing types and colors may be considered. By the potentially optimized laundry treatment according to the invention, in particular the removal of soiling, negative effects of a laundry treatment program such as bleeding of color, damage and wear per se of laundry items may be prevented or at least significantly reduced.

The invention permits a user of a household appliance a simple and clear view of a "stain removal" use case and simple and convenient accessibility and control of a laundry treatment appliance. All this may take place according to the invention with minimal user interaction.

Further details of the invention are disclosed in the following description of non-limiting embodiments. In this case reference is made to FIGS. 1 and 2.

DETAILED DESCRIPTION OF THE INVENTION

Figure 1:
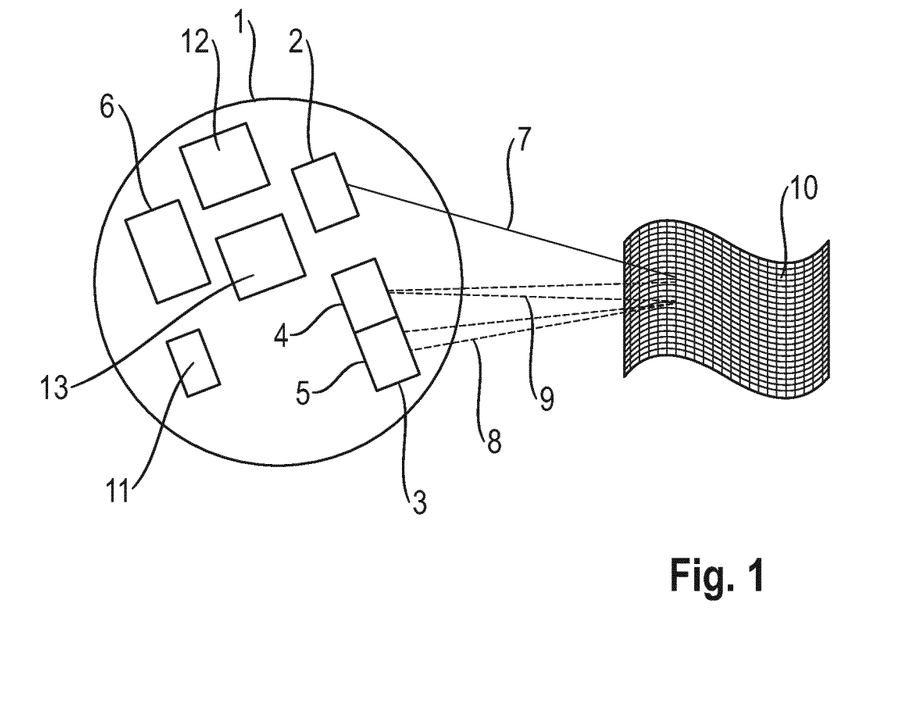
FIG. 1 shows an embodiment of a handheld scanner according to the invention.

FIG. 1 shows a non-limiting embodiment of a handheld scanner 1 according to the invention. The embodiment of the handheld scanner 1 with a spherical housing is visible by way of example and serves merely for illustration. According to the invention, the outer design of the handheld scanner is not limited. The handheld scanner 1 has an RGB sensor 2 by means of which the visual color and/or color information 7 of a laundry item 10 and, in particular, of the soiling thereof may be established. In this case, at a reference point which generally has no soiling and at one or more stain points, in each case the visual color is measured by the values r=red, g=green, b=blue and c=clear (reference), which is transmitted by the control unit 6 and an interface 11 for wireless data communication to an external server (cloud), not shown here. The handheld scanner 1 additionally has an IR spectrometer 3, in this case an NIR spectrometer, which comprises a radiation source 4 and a radiation detector 5. By means of the IR spectrometer 3 the type and quantity of soiling and preferably also the fiber material and the fiber component in the laundry item 10 may be determined, by the laundry item 10 in a first measurement at the reference point and in a second measurement at the soiled point being subjected to radiation 8 from the radiation source 4 and the radiation detector 5 detecting the reflected radiation 9 in each case as a measured signal. The data determined by the RGB sensor 2 and the IR spectrometer 3, so-called first and second data, is transmitted to the external server, not shown, which together with the handheld scanner 1 and a laundry treatment appliance, also not shown here, forms a system for treating laundry items in which a method is carried out, comprising the steps (a) first scanning of at least one laundry item with the handheld scanner at a reference point, and recording an IR spectrum and/or RGB sensor signals;

(b) transmitting the IR spectrum obtained in step (a) and/or the RGB sensor signals obtained in step (a) as first data to the external server;

(c) second scanning of the at least one laundry item (10) of step (a) with the handheld scanner 1 at a stain point of the at least one laundry item 10 having soiling;

(d) transmitting the IR spectrum obtained in step (c) and/or the RGB sensor signals obtained in step (c) as second data to the external server;

(e) evaluating the IR spectra and/or the RGB sensor signals regarding the type and/or quantity of soiling as third data; and (f) transmitting the third data to the handheld scanner 1 and/or the laundry treatment appliance.

The handheld scanner 1 has an operating unit 12. Via the operating unit 12, for example via an input mask, at least one piece of information relative to the laundry item 10 and the soiling thereof may be input by a user. To this end, so-called third data is shown to the user on an acoustic and optical display device 13. In addition to information relative to soiling and the laundry items per se as third data, proposals for the further treatment and, in particular, stain removal may also be made to a user. The embodiment shown here is a display of types of soiling but preferably also types of clothing and/or groups of types of clothing which are the most probable relative to the fiber materials and fiber components using the evaluation in the external server. These types of soiling are preferably arranged on the display device. Information about stain classifications or the display of an evaluation of the stains regarding their chemical composition is possible here, for example hydrocarbons, proteins, fats, acids, sugars, etc.

Finally, for optimal stain removal the type of clothing may also be considered, wherein in addition to the automatic determination it is also possible for this to be assisted by the user who may input further information relevant thereto. In this case, preferably types of clothing and/or groups of types of clothing are arranged on the display device 13 with a reducing probability of their occurrence. In such an embodiment of the invention a user may select one of these types of clothing and/or groups of types of clothing as an input on the operating unit 12, preferably by contact with an operating device designed as a touchscreen, which combines the functions of an operating unit 12 and display device 13.

The data transmitted in the steps (b) and (d) to the external server, i.e. IR spectra and RGB sensor signals, is namely evaluated there and in step (e) transmitted as third data to the handheld scanner 1 and displayed on the acoustic and optical display device 13 of the handheld scanner 1, where based on the third data a user preferably makes additional inputs relative to the soiling, in particular the type and quantities thereof, and optionally an additional input relative to the measured laundry items 10 per se.

Figure 2:
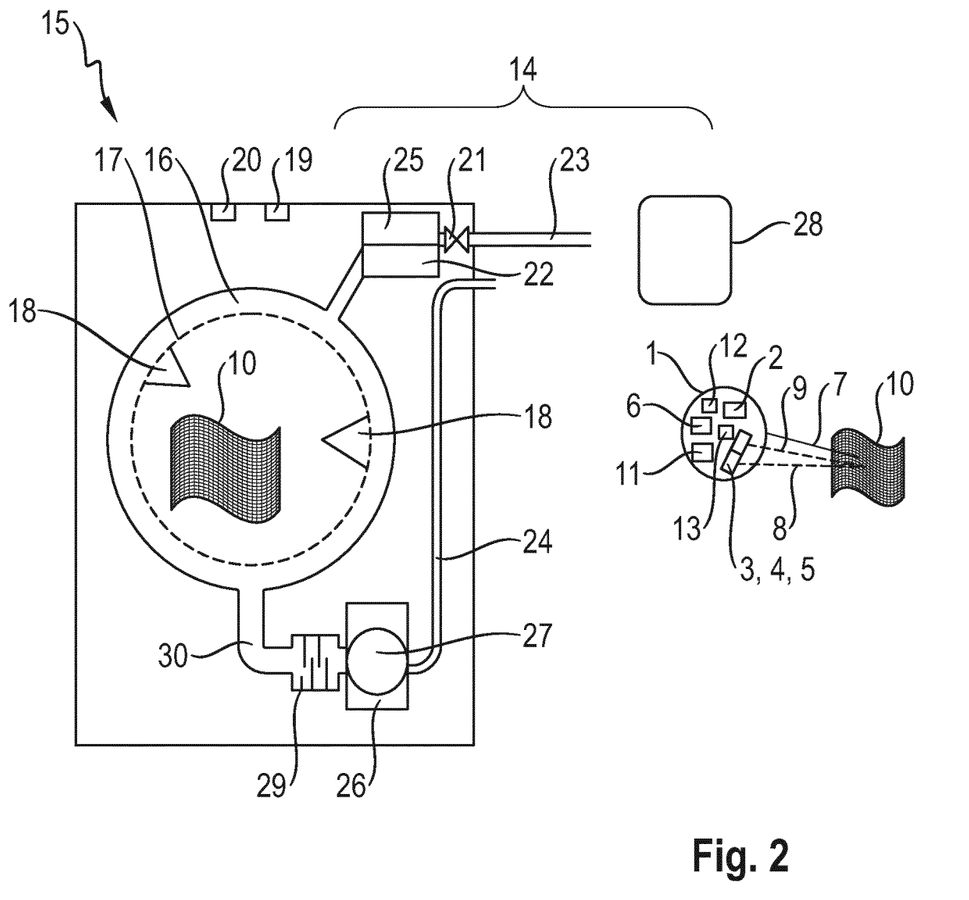
FIG. 2 shows an embodiment of a system according to the invention comprising a handheld scanner, an external server and a laundry treatment appliance.

FIG. 2 shows a non-limiting embodiment of a system 14 according to the invention comprising a handheld scanner 1, an external server 28 and a washing machine 15 as a non-limiting example of a laundry treatment appliance.

The handheld scanner 1 has an operating unit 12. Via the operating unit 12, for example via an input mask, at least one piece of information may be input by a user relative to the laundry item 10 and, in particular, relative to one or more types of soiling of the laundry item 10. To this end, so-called third data is displayed to the user on an acoustic and optical display device 13. This information serves for complementing the already evaluated first and second data of IR spectrometer 3 and RGB sensor 2 relative to the soiling and optionally the laundry items 10 per se. For example, in addition to information about stains, information about the type of laundry item, such as blouses, undergarments, bed linen, long-sleeved or short-sleeved shirts, etc. is also included therein. Otherwise, the reference numerals have the same significance as in FIG. 1.

In the embodiment shown here, the handheld scanner 1, the washing machine 15 and the external server 28 may wirelessly communicate with one another, even if the interface for wireless communication is shown only for the handheld scanner 1.

The washing machine 15 used in this embodiment in the system 14 has a tub 16 in which a drum 17 for receiving laundry items 10 is rotatably mounted about an axis located perpendicular to the plane of the figure. Laundry agitators 18 are arranged in the drum 17. The washing machine 15 also has an automatic dosage unit 25 for treatment means which is attached to a detergent dispenser tray 22. Via the detergent dispenser tray 22 the tub 16 may be supplied with water from a fresh water line 23. To this end, a check valve 21, which is activated by a control unit 20 according to a treatment program sequence, is located in the fresh water line 23. The washing machine 15 in this embodiment also has an optical and acoustic display unit 19 which is designed for displaying information in the form of text, images and/or animation in black/white and/or color. In principle, the information shown on the handheld scanner 1 is also displayed on the optical and acoustic display unit 19. Similarly, an input by a user may optionally also be made directly on the washing machine 15.

REFERENCE NUMERALS

1 Handheld scanner
2 RGB sensor
3 IR spectrometer, in particular NIR spectrometer 4 Radiation source
5 Radiation detector
6 Control unit (in handheld scanner)
7 Color information
8 Emitted radiation
9 Reflected radiation
10 Laundry item
11 Interface for wireless data communication in handheld scanner
12 Operating unit (for example touchscreen)
13 Optical and/or acoustic display device in handheld scanner
14 System for treating laundry items
15 Laundry treatment appliance; washing machine or washer dryer
16 Tub
17 Treatment chamber (drum)
18 Laundry agitators
19 Optical or acoustic display device of the washing machine
20 Control unit (in washing machine)
21 Check valve
22 Detergent dispenser tray
23 Fresh water line
24 Drainage line
25 (Automatic) dosage unit
26 Drive motor
27 Pump
28 External server (in particular in a cloud)
29 Lint remover
30 Tub drainage line

The invention claimed is:

1. A handheld scanner, comprising:
an infrared (IR) spectrometer having a radiation source and a radiation detector;
a controller;
an interface for wireless data communication;
a red, green, blue (RGB) sensor;
the handheld scanner being configured for detecting soiling on a laundry item; and
the handheld scanner being configured to:
record a dark spectrum D when the radiation source of the IR spectrometer is switched off;
scan at least one laundry item with the handheld scanner at a reference point, and record an IR spectrum and/or RGB sensor signals;
transmit the IR spectrum obtained in step (a) and/or the RGB sensor signals obtained in step (a) as first data to an external server;
scan the at least one laundry item of step (a) with the handheld scanner at a stain point of the at least one laundry item having soiling;
transmit an IR spectrum obtained in step (c) and/or RGB sensor signals obtained in step (c) as second data to the external server; and
receive third data from the external server, said third data regarding a type and/or quantity of soiling, determined based on an evaluation of the IR spectrum and/or the RGB sensor signals by the server.

2. The handheld scanner according to claim 1, further comprising an optical and/or acoustic display device for displaying evaluated data from said IR spectrometer and/or said RGB sensor.

3. The handheld scanner according to claim 1, further comprising an input for entering inputs from a user.

4. The handheld scanner according to claim 2, wherein:
said controller is configured for communication with the external server via said interface for wireless data communication, in the communication first data and/or second data of said IR spectrometer and/or said RGB sensor relative to laundry items measured by the handheld scanner at a reference point and at a stain point is transmitted to the external server, the first data and the second data being evaluated in the external server regarding a type and/or quantity of soiling, and results of evaluations are then transmitted as third data to the handheld scanner and/or a laundry treatment appliance.

5. The handheld scanner according to claim 4, wherein the third data transmitted to the handheld scanner is displayed on said optical and/or acoustic display device.

6. The handheld scanner according to claim 5, wherein a user may make additional inputs based on the third data relative to soiling.

7. The handheld scanner according to claim 4, wherein the first data and the second data being evaluated in the external server regarding a fiber material, a fiber component and/or a visual color and results of evaluations are then transmitted as part of the third data to the handheld scanner and/or the laundry treatment appliance.

8. The handheld scanner according to claim 6, wherein a user may make additional inputs based on the third data relative to measured laundry items.

9. A system for treating laundry items, the system comprising:
an external server;
a laundry treatment appliance; and
a handheld scanner having an infrared spectrometer with a radiation source and a radiation detector, a controller, an interface for wireless data communication with said external server and a red, green, blue sensor, said handheld scanner further configured to detect soiling on the laundry items;
said handheld scanner configured to:
record a dark spectrum D when the radiation source of the IR spectrometer is switched off;
scan at least one laundry item with the handheld scanner at a reference point, and record an IR spectrum and/or RGB sensor signals;
transmit the IR spectrum obtained in step (a) and/or the RGB sensor signals obtained in step (a) as first data to an external server;
scan the at least one laundry item of step (a) with the handheld scanner at a stain point of the at least one laundry item having soiling;
transmit an IR spectrum obtained in step (c) and/or RGB sensor signals obtained in step (c) as second data to the external server; and
said server configured to:
evaluate the IR spectrum and/or the RGB sensor signals regarding a type and/or quantity of soiling as third data; and
transmit the third data to the handheld scanner and/or the laundry treatment appliance.

10. A method for operating a system for treating laundry items, the system having a handheld scanner, an external server and a laundry treatment appliance, wherein the handheld scanner having an infrared spectrometer with a radiation source and a radiation detector, a controller, an interface for wireless data communication with the external server and a red, green, blue sensor, which comprises the steps of:
(a1) recording a dark spectrum D when the radiation source of the IR spectrometer is switched off;

(a) scanning at least one laundry item with the handheld scanner at a reference point, and recording an IR spectrum and/or RGB sensor signals;

(b) transmitting the IR spectrum obtained in step (a) and/or the RGB sensor signals obtained in step (a) as first data to the external server;

(c) scanning the at least one laundry item of step (a) with the handheld scanner at a stain point of the at least one laundry item having soiling;

(d) transmitting an IR spectrum obtained in step (c) and/or RGB sensor signals obtained in step (c) as second data to the external server;

(e) evaluating the IR spectrum and/or the RGB sensor signals regarding a type and/or quantity of soiling as third data; and (f) transmitting the third data to the handheld scanner and/or the laundry treatment appliance.

11. The method according to claim 10, wherein in step (f), transmitting the third data to the handheld scanner and displaying the third data on an acoustic and/or optical display device of the handheld scanner.

12. The method according to claim 10, wherein in step (a) at the reference point and in step (c) at the at least one stain point three color values, namely a red, a green and a blue value, and a clear value which corresponds to a total light reflected, are recorded as the RGB sensor signals.

13. The method according to claim 10, wherein in step (e) RGB values measured at the stain point and at the reference point are subtracted from one another.

14. The method according to claim 10, wherein in order to obtain a reflection spectrum R of the stain, a reflection spectrum I recorded in step (c) at the stain point is compared with a reflection spectrum $I_c$ measured in step (a) at the reference point, wherein by considering the dark spectrum D, the following formula is used for determining the reflection spectrum R:

$$R=(I-D)/(I_c-D).$$

15. The method according to claim 10, wherein laundry treatment programs are assigned to the third data in the laundry treatment appliance according to an input of mechanical energy into the laundry items.

16. The method according to claim 10, wherein at least one laundry treatment program is assigned to the third data in the laundry treatment appliance according to the type and/or quantity of soiling.

* * * * *